Figure 1:
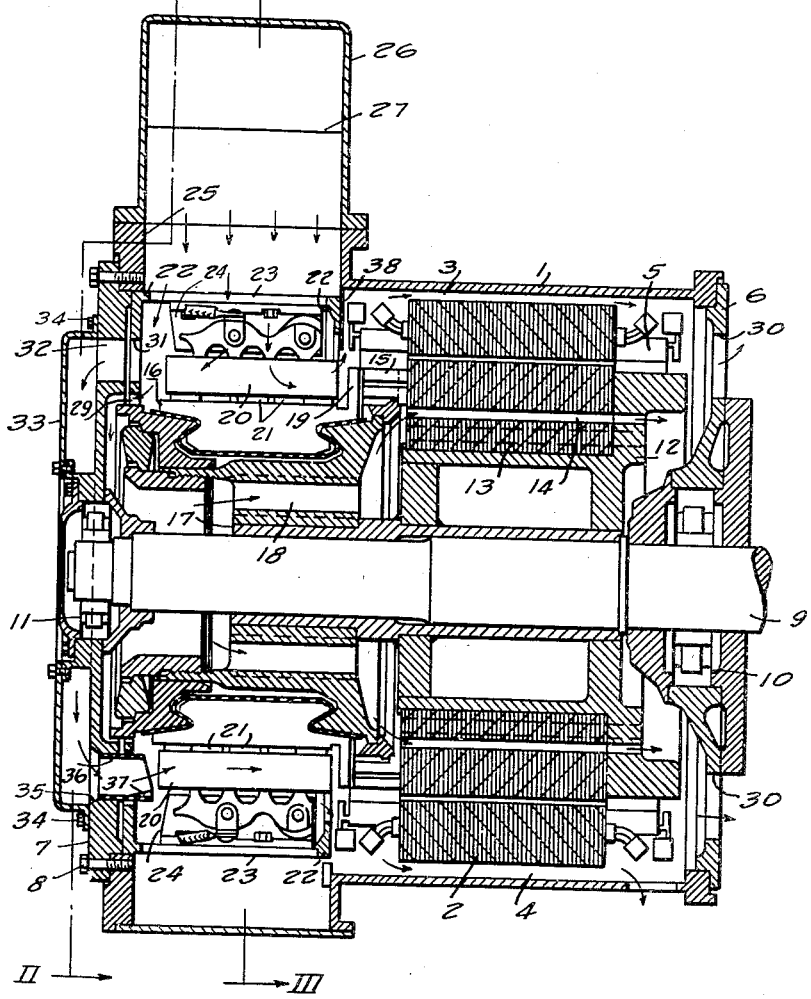

Feb. 17, 1948.   E. O. MUELLER   2,436,322
VENTILATION OF DYNAMOELECTRIC MACHINES
Filed Nov. 10, 1944   2 Sheets-Sheet 1

WITNESSES:

INVENTOR
Erich O. Mueller.
BY
ATTORNEY

Feb. 17, 1948.  E. O. MUELLER  2,436,322
VENTILATION OF DYNAMOELECTRIC MACHINES
Filed Nov. 10, 1944  2 Sheets-Sheet 2

WITNESSES:
E. A. McCloskey
F. P. Lyle

INVENTOR
Erich O. Mueller.
BY O. B. Buchanan
ATTORNEY

Patented Feb. 17, 1948

2,436,322

UNITED STATES PATENT OFFICE 2,436,322

VENTILATION OF DYNAMOELECTRIC MACHINES

Erich O. Mueller, Irwin, Pa., assignor to Westinghouse Electric Corporation, East Pittsburgh, Pa., a corporation of Pennsylvania Application November 10, 1944, Serial No. 562,783

9 Claims. (Cl. 171—252)

The present invention relates to the ventilation of dynamo-electric machines and, more particularly, to the ventilation of electric railway motors of the commutator type.

The invention is especially adapted for the ventilation of electric motors such as the single-phase alternating current commutator motors used on electric locomotives, although it obviously could also be used in other types of commutator machines. Railway motors are mounted on the trucks of the locomotive or car, so that the physical size of such motors is subject to rigid limitations, as determined by the dimensions of the trucks, but such motors are required to develop relatively high horsepower output, which means high motor speeds and heavy currents in the motor. The increasing demand for motors of larger and larger output without any increase in size results in the necessity of designing these motors for higher and higher currents, which involves increasing difficulty in providing adequate cooling. Since the axial length of the commutator in commutator type railway motors is limited, the high currents involved result in relatively high current density in the commutator, and the large amount of heat generated, together with the relatively large number of large brushholders which surround the commutator, create a difficult problem of cooling the brushholders and commutator.

In the usual method of ventilation which has been used heretofore for railway motors, ventilating air is supplied to the motor through a duct from a blower on the locomotive. The duct is connected to an air inlet opening in the top of the motor frame directly over the commutator, and the air is intended to flow circumferentially around the commutator and then into the ventilating passages in the stator and rotor members of the motor, escaping through discharge openings at the opposite, or pinion, end of the motor. The heavy currents involved in these motors require the use of a relatively large number of brushholders spaced around the commutator, and these brushholders impede the circumferential flow of ventilating air, since in effect they divide the space around the commutator into a number of chambers, and obstruct the flow of air from one chamber to the next, forcing the air to flow away from the commutator surface, where it is needed, toward the rocker rings at the ends of the brushholders, and the frame, where no great amount of cooling air is needed.

The air in the spaces between the brushholders, therefore, does not flow freely around the commutator so that there are pockets of hot air adjacent the commutator surface in these spaces, especially at the lower side of the commutator, or the side opposite the air inlet. These hot air pockets cause relatively high commutator and brush temperatures which are very detrimental to successful operation. This inadequate air circulation is especially undesirable when the motor is being started under a heavy load when the current is at a maximum and there is no natural ventilation as the armature is just beginning to rotate. Insufficient ventilation permits the brushes and brushholders, and the commutator bars themselves, to become extremely hot in a very short time, and burned and loose commutator bars may result. Thus, the inadequate circulation of air obtained with the conventional ventilating systems for commutator type railway motors of high horsepower output results in excessive commutator and brush temperatures, and often leads to failure of the commutator after a relatively short period of service.

Another difficulty which is sometimes encountered is excessive heating of the commutator bar necks to which the connections to the rotor windings are soldered. These soldered connections sometimes become hot enough in service to soften the solder and cause the connections to loosen, resulting in open circuits, because the commutator bar necks are not adequately cooled. Thus, the existing method of cooling railway motors of the commutator type has become inadequate for present and future needs, and better ventilating means must be provided in order to permit high horsepower ratings of these motors without increasing the physical size.

The principal object of the present invention is to provide an improved ventilating system for commutator type electric motors of high horsepower rating.

Another object of the invention is to provide a ventilating system for commutator type electric motors which is so designed that the ventilating air strikes the commutator surface and brushholders at high velocity, and in which hot air pockets in the spaces between the brushholders are eliminated, and very effective circulation of the air is obtained.

A further object of the invention is to provide a ventilating system for commutator type motors in which the ventilating air flows over the commutator and the brushholders and then into passages in the stator and rotor members, and in which substantially all of the air flowing from the commutator into the stator air passages on at least one side of the machine is forced to flow directly over the commutator bar necks to prevent excessive heating and loosening of the soldered connections between the commutator and the rotor windings.

A more specific object of the invention is to provide a ventilating system for electric railway motors of the commutator type in which high-velocity streams of air are blown directly into the spaces between the brushholders all the way around the commutator, so as to provide the most effective cooling of the commutator and brush-holders and to prevent the existence of pockets of hot air between the brushholders.

This result might be accomplished by connecting the air duct which supplies ventilating air to the motor to an air shield on the end of the motor, and directing the air from the air shield into the spaces between the brushholders. Such an arrangement, however, would not be suitable because the air shield would have to carry all of the ventilating air required for the motor and would necessarily be rather large. There is only a limited space available between the end of the motor and the adjacent wheel of the locomotive, however, and in order to accommodate an air shield of the required size in this space, it would be necessary to shorten the motor itself. This, of course, would aggravate the heating problem resulting from the heavy currents, so that no real improvement could be obtained in this way. With such an arrangement, it would also be necessary to locate the air duct very close to the locomotive wheels, and in a position where it would interfere with the supports for the body of the locomotive.

In accordance with the present invention, the air duct may be located in the usual position, and it is connected to an air inlet opening in the motor frame directly over the commutator. Part of the air flowing through the duct is directed in a plurality of generally radial streams into the spaces between the brushholders on the side of the commutator adjacent the air inlet, and this air flows from the commutator into ventilating passages in both the rotor and stator members. Another part of the air from the duct flows into an air shield at the end of the motor and flows to the opposite side of the motor, where it is directed in a plurality of generally axial streams into the spaces between the brushholders on the side of the commutator opposite to the air inlet. Since the air shield has to carry only about one-half of the ventilating air for the motor, it can be made small enough to fit into the available space between the end of the motor and the adjacent wheel without requiring any decrease in the size of the motor, and a method of cooling is thus provided which is much more effective than the usual methods which have been used heretofore.

Figure 3:
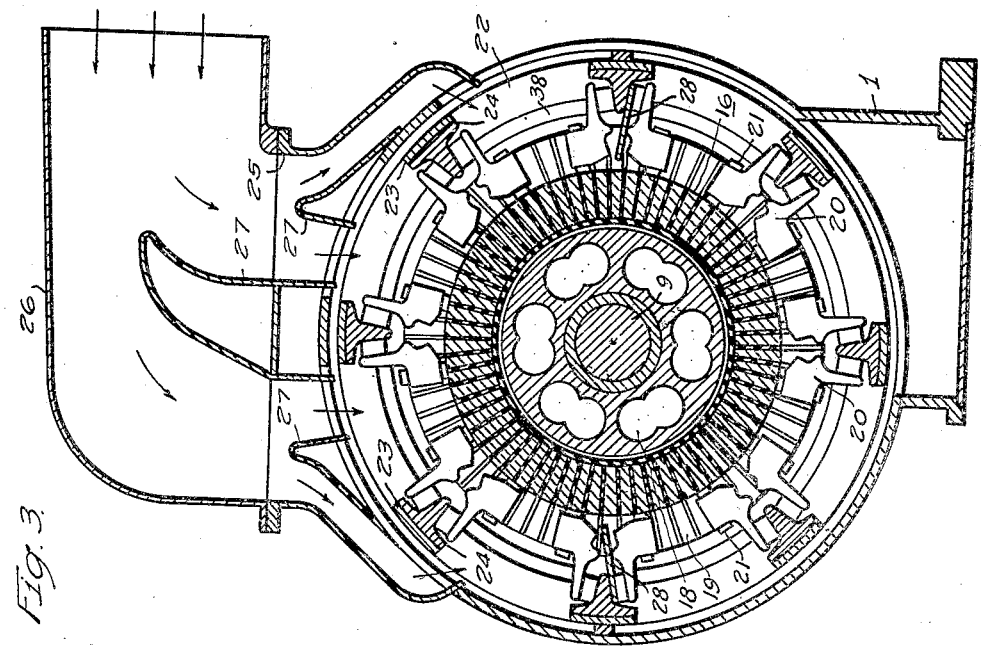
Figure 2:
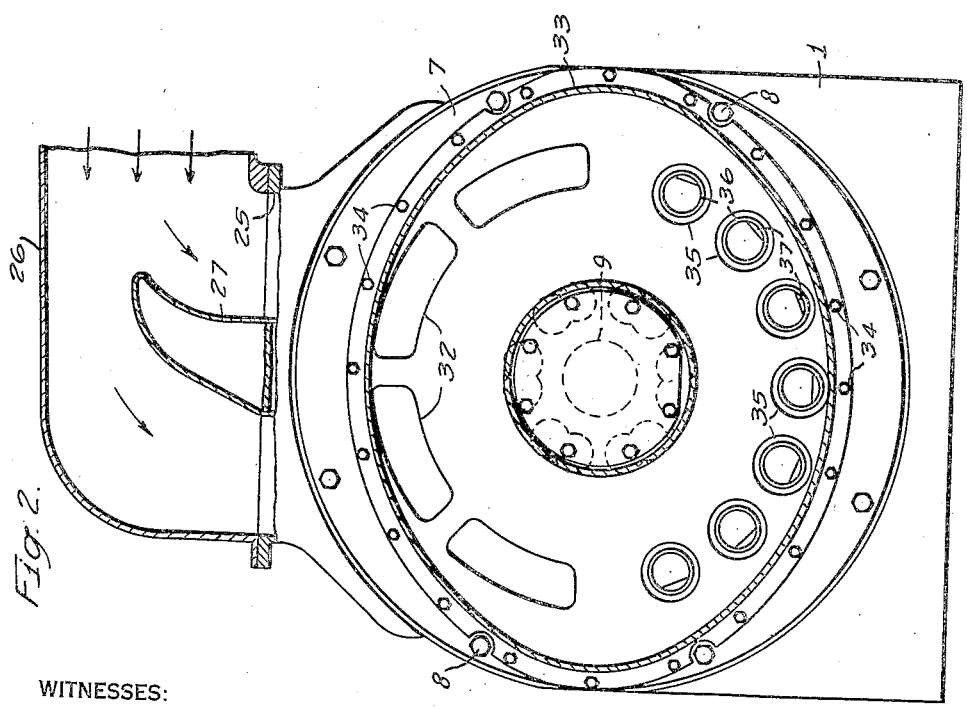

The invention will be more fully understood from the following detailed description, taken in connection with the accompanying drawings, in which;

Figure 1 is a longitudinal sectional view of a motor embodying the invention; and Figs. 2 and 3 are transverse sectional views on the lines II—II and III—III of Fig. 1, respectively.

The invention is shown in the drawings as embodied in an electric railway motor having a frame 1 in which is supported a laminated stator core 2. The core may be supported in the frame 1 in any suitable manner, as by means of longitudinal ribs on the interior surface of the frame, and it is preferably arranged to provide ventilating passages between the outside periphery of the stator core and the frame 1. As shown in Fig. 1, the stator core 2 is disposed so that the ventilating passages 3 at the top of the frame are much smaller in area than the passages 4 at the lower side of the frame. This may be accomplished by mounting the core eccentrically in the frame 1, or in any other desired manner. Suitable stator windings 5 of any desired type are placed in slots in the stator core 2. The frame 1 is closed by an end housing 6 of any suitable type at the pinion end of the motor, and by an end housing 7 at the commutator end. The end housings 6 and 7 may be secured to the frame 1 in any desired manner, as by bolts 8.

The shaft 9 of the motor is supported by roller bearings 10 and 11 in the end housings 6 and 7, respectively, and a rotor member 12 of any suitable type, having a laminated rotor core 13, is secured on the shaft 9. A plurality of axial ventilating passages 14 extend through the core 13, and a suitable rotor winding 15 is placed in slots in the periphery of the core 13. A commutator, generally indicated at 16, is supported on a commutator spider 17 mounted on the shaft 9, and a plurality of axial ventilating passages 18 extend through the commutator spider 17. The bars of the commutator 16 have necks or risers 19 at one end to which the rotor winding 15 is connected by soldered joints in the usual manner. Brushholders 20 for the brushes 21 which engage the commutator surface are supported on a rocker ring structure which includes opposed rocker rings 22 connected by axial bars 23. Brush arms 24 are secured to the bars 23, and the brushholders 20 are attached to the brush arms 24 in any suitable manner.

An air inlet opening 25 is formed in the top part of the frame 1 at one end thereof directly over the commutator 16. Ventilating air is supplied to the motor through this inlet opening by means of a duct 26 through which a high-velocity stream of cool air is forced in any suitable manner, as by a blower on the locomotive. The air flowing through the duct 26 into the inlet opening 25 is divided into a plurality of streams by means of baffles 27 disposed in the inlet opening. These baffles are arranged, as shown in Fig. 3, to divide the incoming air into a number of streams corresponding to the number of spaces between the brushholders 20 on the upper side of the commutator 16, and the baffles are shaped to effect a uniform and gradual change in direction of the air flow. The baffles 27 extend entirely across the inlet 25 in the axial direction, and the spacing between the baffles is made such that the velocity of the air flowing into the motor through the spaces between the baffles is the same as the velocity of the air in the duct 26. Thus, the baffles 27 in effect form a plurality of nozzles through which high-velocity streams of cool air are directed in a generally radial direction into the spaces between the brushholders on the upper side of the commutator, as shown by the arrows in Fig. 3.

The air directed against the upper side of the commutator 16 in this manner is substantially prevented from flowing to the lower side of the commutator by means of baffle plates 28 on opposite sides of the commutator which divide the upper part of the space around the commutator from the lower part. About half of the air flowing through the inlet opening 25 flows radially over the brushholders on the upper side of the commutator and strikes the surface of the commutator at high velocity, thus having a very strong cooling effect. A part of this air, after striking the commutator, flows toward the end of the machine and into the ventilating passages 13 and 14 in the rotor through the relatively wide clearance 29 between the end of the commutator and the end housing 7. The remainder of the air on the upper side of the commutator, after striking the commutator surface flows toward the opposite end of the machine, and flows through the air gap and through the ventilating passage 3 between the stator core 2 and the frame 1. The air flowing through both the rotor and stator passages escapes through discharge openings 30 at the pinion end of the motor.

The rest of the air flowing through the inlet opening 25 from the duct 26, which does not strike the upper part of the commutator, flows past the brushholders and through corresponding openings 31 and 32 in the rocker ring 22 and end housing 7 into an air shield 33 which is secured to the outer surface of the end housing 7 in any suitable manner, as by screws 34. The air flowing into the air shield 33 in this manner, as shown by the arrows in Fig. 1, flows through the air shield which functions as a duct to direct the air to the opposite, or lower, side of the motor. At the lower side, the air flows through a plurality of openings 35 in the end housing 7 back into the interior of the motor. Tubular members or nozzles 36 are preferably placed in these openings to direct the air in generally axial streams into the spaces between the brushholders 20 at the lower side of the commutator, and, if desired, wedge-shaped baffles 37 may be placed in the tubular nozzles 36 to give the air a slight radial component.

Thus, the air flowing through the air shield 33 is directed in a plurality of generally axial, high-velocity streams into the spaces between the brushholders at the side of the commutator opposite to the air inlet 25. This air flows across the commutator surface and across the brushholders 20 at high velocity so as to have a very strong cooling effect, and after passing over the commutator it flows into the air gap and into the relatively large passages 4 between the stator core 2 and the frame 1, escaping through the discharge openings 30 at the opposite end of the machine. It will be noted that the clearance between the end of the commutator and the end housing 7 is made quite small at the lower side of the machine, and since the nozzles 36 extend substantially past this clearance, practically none of the air on the lower side flows into the rotor air passages.

A ring-shaped baffle member 38 is preferably also provided between the rocker ring 22 and the stator core 2, as shown in Fig. 1. The baffle 38 is arranged so as to cause substantially all of the air flowing from the commutator towards the stator air passages 3 to flow directly across the commutator bar necks 19. In this way, the necks 19 and the soldered connections of the winding 15 to the commutator bars are prevented from becoming too hot, and softening of the solder and loosening of these connections in service is prevented. The baffle 38 may extend all the way around the machine if desired but it is usually sufficient for it to be placed only on the upper half of the machine, as shown in Fig. 1, since the commutator rotates at high speed and it is only necessary for this cooling to be provided at one side.

As previously described, the passages 3 between the stator core 2 and the frame 1 at the side of the machine adjacent the air inlet are made smaller than the corresponding passages 4 at the opposite side of the machine. The relatively small passages 3 result in a high back pressure tending to oppose the flow of air from the commutator, and this effect helps to force the air to flow through the clearance 29 and into and through the rotor air passages 13 and 14, and into the air gap. It has been found that the air flowing at the back of the stator core in the passages 3 has only a relatively slight cooling effect, and the reduction of air flow through these passages, therefore, has no material effect on the temperature rise of the motor. Thus, the air directed against the upper side of the commutator is used to cool the rotor by flowing through the passages 13 and 14, as well as to cool the stator windings and stator core.

The air diverted through the openings 32 and the air shield 33 is used only to cool the lower side of the commutator and the brushholders on that side, and the lower part of the stator core and windings. For this reason, the air shield 33 can be made relatively small in axial width since it needs to be only large enough to carry the required volume of air for this purpose, and thus it can readily be made to fit into the available space. As previously indicated, the air passages 4 between the stator core and frame at the side opposite the air inlet opening 25 are made of relatively large size. By making these passages relatively large, the back pressure is kept quite low, and the pressure difference across the commutator is kept high so as to maintain a high-velocity flow of air across the lower side of the commutator, and the brushholders on that side, to obtain the maximum cooling effect. Since all of the air passing across the lower side of the commutator must escape through the stator air passage 4, these air passages must necessarily be of relatively large size to provide an adequate area for the escape of the air without producing too high a back pressure which would tend to reduce the air velocity.

It should now be apparent that a ventilating system has been provided for electric motors of the commutator type which provides very effective cooling of the commutator and the brushholders, which are the critical parts of the machine, so far as temperature rise is concerned, in the case of motors of large horsepower rating, such as railway motors, where the dimensions are subject to strict limitations. The new system makes it possible to use air ducts arranged on the locomotive in the usual manner and connected to the motor frame at a location substantially the same as that used in previous constructions. Thus the new system does not involve any difficult rearrangements of the parts of the cooling system external to the motor itself. By providing an air shield on the end of the motor which needs to be only large enough to carry half of the ventilating air required for the motor, no change in size of the motor is required, but full advantage is taken of the available space. By using this air shield, the ventilating air is directed in axial streams into the spaces between the brushholders at the lower side of the commutator, while air is directed in radial streams into the spaces between the brushholders at the upper side of the commutator. In this way very effective cooling is obtained since no hot air pockets can exist between the brushholders, and higher horsepower ratings of the motor are made possible without increase in the size of the motor than were obtainable with the previously used constructions.

It is to be understood that although a specific embodiment of the invention has been shown and described for the purpose of illustration, the invention is capable of various other embodiments and modifications, and in its broadest aspects, it includes all equivalent constructions and embodiments which come within the scope of the appended claims.

I claim as my invention:

1. A dynamo-electric machine having a stator member and a rotor member, a commutator on the rotor member, a plurality of brushholders supported on the stator member and spaced apart circumferentially around the commutator, inlet means for ventilating air in the stator member at one side of the commutator, means for directing a part of said air in a plurality of generally radial streams into the spaces between the brushholders on the side of the commutator adjacent said inlet means, and means for directing another part of the ventilating air in a plurality of generally axial streams into the spaces between the brushholders on the other side of the commutator.

2. A dynamo-electric machine having a stator member and a rotor member, a commutator on the rotor member, a plurality of brushholders supported on the stator member and spaced apart circumferentially around the commutator, inlet means for ventilating air in the stator member at one side of the commutator, means for directing a part of said air in a plurality of generally radial streams into the spaces between the brushholders on the side of the commutator adjacent said inlet means, an air shield on the stator member adjacent the end of the commutator, means for causing another part of the ventilating air to flow into said air shield at the side of the commutator adjacent the inlet means, the air shield extending to the other side of the commutator, and means for directing the air from the air shield in a plurality of generally axial streams into the spaces between the brushholders on said other side of the commutator.

3. A dynamo-electric machine having a stator member and a rotor member, a commutator on the rotor member, a plurality of brushholders supported on the stator member and spaced apart circumferentially around the commutator, inlet means for ventilating air in the stator member at one side of the commutator, baffle means for dividing said ventilating air into a plurality of streams and for directing a part of the air in generally radial streams into the spaces between the brushholders on the side of the commutator adjacent the inlet means, means for substantially preventing direct flow of air from one side of the commutator to the other, an air shield on the stator member adjacent the end of the commutator, means for causing another part of the ventilating air to flow into said air shield at the side of the commutator adjacent the inlet means, the air shield extending to the other side of the commutator, and means for directing the air from the air shield in a plurality of generally axial streams into the spaces between the brushholders on said other side of the commutator.

4. A dynamo-electric machine having a stator member and a rotor member, said rotor member including a commutator and having passages for ventilating air, said stator member including a frame and a stator core supported in the frame, the stator member also having passages for ventilating air, a plurality of brushholders supported on the stator member around the commutator, inlet means in the frame at one side of the commutator for admitting air to the machine, means for substantially preventing direct flow of air from one side of the commutator to the other, means for directing a part of the air from the inlet means in a plurality of generally radial streams into the spaces between the brushholders on the side of the commutator adjacent the inlet means, said air also flowing into the rotor air passages, and into the adjacent stator air passages, duct means for directing another part of the air from the inlet means to the opposite side of the commutator, and means for directing the air from said duct means in a plurality of generally axial streams into the spaces between the brushholders on said opposite side of the commutator, said air flowing therefrom into the adjacent stator air passages.

5. A dynamo-electric machine having a stator member and a rotor member, said rotor member including a commutator and having passages for ventilating air, said stator member including a frame and a stator core supported in the frame, the stator member also having passages for ventilating air, a plurality of brushholders supported on the stator member around the commutator, baffle means extending at least part way around the machine between the brushholders and the stator core, inlet means in the frame at one side of the commutator for admitting air to the machine, means for substantially preventing direct flow of air from one side of the commutator to the other, means for directing a part of the air from the inlet means in a plurality of generally radial streams into the spaces between the brushholders on the side of the commutator adjacent the inlet means, said air also flowing into the rotor air passages and into the adjacent stator air passages, said baffle means causing air flowing into the stator air passages to flow directly over the end of the commutator, duct means for directing another part of the air from the inlet means to the opposite side of the commutator, and means for directing the air from said duct means in a plurality of generally axial streams into the spaces between the brushholders on said opposite side of the commutator, said air flowing therefrom into the adjacent stator air passages.

6. A dynamo-electric machine having a stator member and a rotor member, said rotor member including a commutator and having passages for ventilating air, said stator member including a frame and a stator core supported in the frame, the stator member also having passages for ventilating air between the frame and the core, said passages being of relatively large size at one side of the machine and being of relatively smaller size at the other side of the machine, a plurality of brushholders supported on the stator member around the commutator, inlet means for ventilating air in the frame adjacent the commutator, said inlet means being on the same side of the frame as the smaller air passages, means for substantially preventing direct flow of air from one side of the commutator to the other, means for directing a part of the air from the inlet means in a plurality of generally radial streams into the spaces between the brushholders on the side of the commutator adjacent the inlet means, said air also flowing into the rotor air passages and into the adjacent stator air passages, duct means for directing another part of the air from the inlet means to the opposite side of the commutator, and means for directing the air from said duct means in a plurality of generally axial streams into the spaces between the brushholders on said opposite side of the commutator, said air flowing therefrom into the adjacent stator air passages.

7. A dynamo-electric machine having a stator member and a rotor member, said rotor member including a commutator and having passages for ventilating air, said stator member including a frame and a stator core supported in the frame, the stator member also having passages for ventilating air, an end housing closing the end of the frame adjacent the commutator, a plurality of brushholders supported on the stator member around the commutator, inlet means in the frame at one side of the commutator for admitting air to the machine, means for substantially preventing direct flow of air from one side of the commutator to the other, means for directing a part of the air from the inlet means in a plurality of generally radial streams into the spaces between the brushholders on the side of the commutator adjacent the inlet means, said air also flowing into the rotor air passages and into the adjacent stator air passages, an air shield on the outside of said end housing, said end housing having openings adjacent the inlet means permitting another part of the air from the inlet means to flow into the air shield, and means at the opposite side of the end housing for directing the air from the air shield in a plurality of generally axial streams into the spaces between the brushholders on the side of the commutator opposite the inlet means, said air flowing therefrom into the adjacent stator air passages.

8. A dynamo-electric machine having a stator member and a rotor member, said rotor member including a commutator and having passages for ventilating air, said stator member including a frame and a stator core supported in the frame, the stator member also having passages for ventilating air, an end housing closing the end of the frame adjacent the commutator, a plurality of brushholders supported on the stator member around the commutator, inlet means in the frame at one side of the commutator for admitting air to the machine, means for substantially preventing direct flow of air from one side of the commutator to the other, means for directing a part of the air from the inlet means in a plurality of generally radial streams into the spaces between the brushholders on the side of the commutator adjacent the inlet means, said air also flowing into the rotor air passages and into the adjacent stator air passages, an air shield on the outside of said end housing, said end housing having openings adjacent the inlet means permitting another part of the air from the inlet means to flow into the air shield, and a plurality of tubular members extending through the end housing into the air shield at the opposite side of the end housing, said tubular members directing the air from the air shield in a plurality of generally axial streams into the spaces between the brushholders on the side of the commutator opposite the inlet means, said air flowing therefrom into the adjacent stator air passages.

9. A dynamo-electric machine having a stator member and a rotor member, said rotor member including a commutator and having passages for ventilating air, said stator member including a frame and a stator core supported in the frame, the stator member also having passages for ventilating air between the frame and the core, said passages being of relatively large size at one side of the machine and being of relatively smaller size at the other side of the machine, an end housing closing the end of the frame adjacent the commutator, a plurality of brushholders supported on the stator member around the commutator, inlet means for ventilating air in the frame adjacent the commutator, said inlet means being on the same side of the frame as the smaller air passages, means for substantially preventing direct flow of air from one side of the commutator to the other, means for directing a part of the air from the inlet means in a plurality of generally radial streams into the spaces between the brushholders on the side of the commutator adjacent the inlet means, said air also flowing into the rotor air passages and into the adjacent stator air passages, an air shield on the outside of said end housing, said end housing having openings adjacent the inlet means permitting another part of the air from the inlet means to flow into the air shield, and a plurality of tubular members extending through the end housing into the air shield at the opposite side of the end housing, said tubular members directing the air from the air shield in a plurality of generally axial streams into the spaces between the brushholders on the side of the commutator opposite the inlet means, said air flowing therefrom into the adjacent stator air passages.

ERICH O. MUELLER.

REFERENCES CITED

The following references are of record in the file of this patent:

UNITED STATES PATENTS

| Number | Name | Date |
| --- | --- | --- |
| 1,525,691 | Poth | Feb. 10, 1925 |
| 1,784,102 | Lincoln | Dec. 9, 1930 |
| 920,725 | Callan | May 4, 1909 |
| 1,883,288 | Zubaty | Oct. 18, 1932 |
| 2,315,177 | Zadnik | Mar. 30, 1943 |